United States Patent [19]

Vander Poorten

[11] Patent Number: 4,695,356

[45] Date of Patent: Sep. 22, 1987

[54] ELECTROCHEMICAL PROCEDURE FOR THE DIRECT FORMING OF GENERALLY THIN ELEMENTS WITH VARIOUS CONTOURS AND SURFACES OF USUAL AND TECHNICAL CERAMICS OR REFRACTORY MATERIAL

[75] Inventor: Henri Vander Poorten, Mons, Belgium

[73] Assignee: Andromaque S.A., Luxembourg, Luxembourg

[21] Appl. No.: 841,446

[22] Filed: Mar. 19, 1986

Related U.S. Application Data

[63] Continuation-in-part of Ser. No. 573,950, Jan. 26, 1984, abandoned.

[51] Int. Cl.[4] .............................................. B01D 57/02

[52] U.S. Cl. .................................. 204/180.9; 204/15; 204/18.1; 204/23; 204/38.6; 204/181.1; 204/181.5; 204/182.2; 204/300 EC

[58] Field of Search ............... 204/181.5, 181.1, 182.2, 204/300 EC, 15, 181, 38 C, 23, 180.9

[56] References Cited

U.S. PATENT DOCUMENTS

| | | | |
|---|---|---|---|
| 2,906,682 | 9/1959 | Fahnoe et al. | 204/181.5 |
| 3,483,109 | 12/1969 | Brane et al. | 204/181.6 |
| 3,575,838 | 4/1971 | Hughes | 204/181.5 |
| 3,841,986 | 10/1974 | Rion | 204/181.5 |
| 4,170,542 | 10/1979 | Chronberg | 204/182.2 |
| 4,225,408 | 9/1980 | Barlow et al. | 204/181.5 |
| 4,263,122 | 4/1981 | Urquhart | 204/300 EC |
| 4,357,222 | 11/1982 | Lucek | 204/180.9 |
| 4,418,027 | 11/1983 | Massoud | 204/182.2 |

FOREIGN PATENT DOCUMENTS

| | | |
|---|---|---|
| 873378 | 5/1979 | Belgium . |
| 880933 | 4/1980 | Belgium . |
| 0022113 | 7/1984 | European Pat. Off. . |

OTHER PUBLICATIONS

Hewins et al., IBM Tech. Disc. Bull., vol. 2 (1959), (Oct.) p. 32.

Arnold et al., IBM Tech. Disc. Bull., vol. 10, (Jun. 1967), p. 9.

Damm et al., IBM Tech. Disc. Bull., (Oct. 1972), p. 1463.

Stanfield, Western Elect. Technical Digest (1977), p. 41.

*Primary Examiner*—Arthur P. Demers

*Attorney, Agent, or Firm*—Robert E. Burns; Emmanuel J. Lobato

[57] ABSTRACT

In a process and apparatus for producing ceramic tiles, such as wall tiles and floor tiles, including thin tiles of a size up to a square meter, metal electrode plates having thereon three-dimensional design and insulating paint or tape defining the boundaries of one or more tiles to be produced, are transported by a conveyor system through a bath of finely divided ceramic material suspended in an aqueous electrolyte while applying an electric potential between the plates and a counter electrode in the bath to produce electrodeposition of ceramic material from the bath onto conductive portions of the plates bounded by the insulating material. The voltage and time of travel in the bath are selected to produce a deposit of ceramic material with a thickness of from 1 to 20 mm. After leaving the bath, the plates, with the deposits thereon are transported through a water spray rinsing station and a drying atmosphere to a transfer station at which the deposits, constituting green tiles, are transfered to refractory supports by which they are carried through a tunnel furnace for further drying and firing. From the transfer station, the plates are further transported through a reconditioning station and back to the bath. Thin flexible water-wettable membranes applied to the plates before deposit of ceramic material thereon facilitate removal of the green tiles from the plates at the transfer station without damage.

26 Claims, 14 Drawing Figures

ELECTROCHEMICAL PROCEDURE FOR THE DIRECT FORMING OF GENERALLY THIN ELEMENTS WITH VARIOUS CONTOURS AND SURFACES OF USUAL AND TECHNICAL CERAMICS OR REFRACTORY MATERIAL

REFERENCE TO PRIOR APPLICATION

This is a continuation-in-part of my application, Ser. No. 573,950 filed Jan. 26, 1984, now abandoned.

BACKGROUND OF THE INVENTION

The invention is concerned with a procedure for making ceramic tiles, individual or incorporated in an ensemble of thin ceramic tiles, without the use of a mould or further stamping of a paste strip, said stamping being always associated with a loss of ±10%. These tiles are fabricated crude, either with straight edges or with various cut out parts with spontaneously rounded off borders. They can be flat or present a profile in space. The surface thereof can be smooth, rough or with a light relief texture. Furthermore the technique allows the incorporation of texts, designs or photographs with details that can even be very fine, and this either raised or depressed in relief, the motifs being really encrusted in the ceramic tiles; it is also possible to use this technique for the fabrication of electronic or electrotechnical substrates. This concerns entirely new procedures with regard to the earlier procedures.

In the specification of the Belgian Pat. No. 873,378 in the name of the applicant, there is described an electrochemical procedure that allows in a single process the casting, moulding, contouring, shaping and surface treatment of elements from raw materials in the form of charged suspended particles and which gives rise to conductive electrodeposits by an electrode reaction that is rigorously controlled.

Moreover in the specification of the Belgian Pat. No. 880 993, also in the name of the applicant, there are described complementary practical ways of application of the technique for the electrodeposition on metallic substrates or moulds of ceramic raw materials that can be vitrified, sintered or polymerised, as well as the use of ion exchangers as a surface for electrochemical casting, and particularly its application to the fabrication of flat glass.

SUMMARY OF THE INVENTION

Classical techniques for the fabrication of ceramics by which similar products are made consist of a succession of basic processes, viz. pressing, extrusion and the casting between two plates.

Pressing requires the cumbersome fabrication of moulds in special, expensive metals and does not allow for any diversifications of forms and patterns while the cost of these moulds makes it imperative to produce a large number of repetative patterns. Furthermore, it is practically impossible to make thin tiles by this technique (for example between 3 and 5 mm in thickness) or large size tiles such as 60×60 cm for example. The fabrication of rounded edges requires the fabrication of special moulds.

Flat rolling is practiced, but it requires external pressure to form without the possibility of rounded edges. Furthermore large thin forms are difficult to make with this second technique.

Forming in plaster moulds (between two halves) is not possible for tiles; for large thin forms the filling of the moulds with clay presents problems and furthermore the plaster moulds are very heavy, are fragile and demand controlled drying after forming.

Electronic substrates for applications in the electrotechnology can be made by a technique called "doctor blade" which allows the fabrication of very thin alumina substrates, but this technique cannot be adapted to the fabrication of individual items.

Finally for the impression of a motif in tiles, the fabrication price of the moulds becomes more and more prohibitive if one tries to impress a complicated and varied pattern with very fine details. Raw materials used for the pressing are for a variety of reasons badly adapted to the production of such patterns.

The impression of motifs by stamping is not possible. With plaster moulds the casting of plates with detailed decoration patterns is very delicate and the fabrication of the moulds themselves presents problems.

Finally the impression of designs, text or photographs on ceramics can be carried out by the classical technique of glueing transfers or by coating with gelatine based photosensitive materials onto the plate. Such procedures do not produce a truly encrustation pattern and photographs would require a veneer of ceramic glazes.

The machines described in the patent literature for the fabrication of ceramics as a soft paste by electrophoresis according to the "doubledeposition" system only produce a paste strip by subsequent stamping without conditioning of the edges, nor a relief, nor the incorporation of decorative patterns.

SUMMARY OF THE INVENTION

The new technique which is the object of the present invention consists of using a metallic plate either plane or profiled; it consists preferably of zinc, galvanised iron, copper, iron, aluminum, tin, stainless steel, magnesium or nickel and forms in general the anode of an electrolytic cell which allows the electrodeposition of ceramic material in suspension.

The contour of the tiles is drawn on these plates by using lines of insulating paint or self adhesive insulating tape, the width of which foreshadows the joints that will exist between the baked tiles when they are laid.

This technique therefore consists of selectively masking the anodes, realising that on an electrically insulated spot no deposit will be obtained at the time of the electrolysis. Such selective masking can also be obtained on ion exchange or semipermeable membranes applied to the anode prior to the disposition of ceramic material thereon. In the areas that have not been insulated, ceramic material will be electrodeposited and develop up to the insulated contours. At the insulated edges, the electrodeposited material takes on spontaneously the rounded edge feature which conforms to the electric field lines at the border between conducting and insulating zones.

It is possible by classical means used in electroplating to exploit the border effect either by deliberately increasing the thickness at the periphery of the tiles or by attenuating this effect.

DESCRIPTION OF PREFERRED EMBODIMENT

Figure 1A:
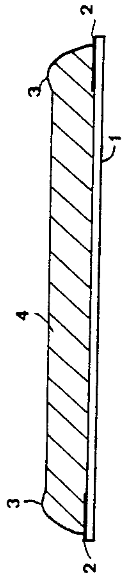
FIG. 1*a:* a tile with slightly raised edge.

In FIG. 1*a* a tile 4 is shown with a raised border 3; the metallic plate 1 is insulated at 2.

Figure 1B:
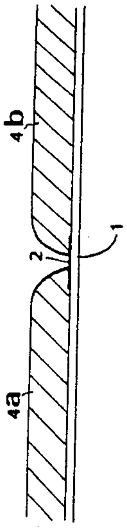
FIG. 1*b:* two tiles, edge to edge without raised edges.

FIG. 1*b* shows two tiles 4*a,* 4*b* formed side by side without a raised edge; the metallic plate 1 is insulated at 2.

Figure 2A:
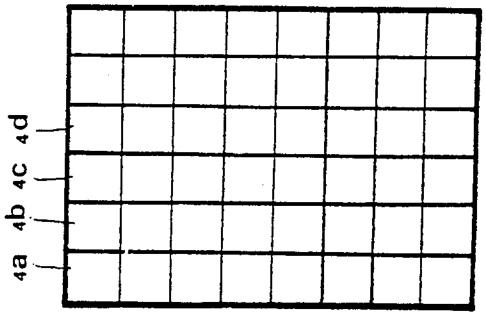
FIG. 2*a:* a plate prepared for the formation of small regular tiles.
Figure 2B:
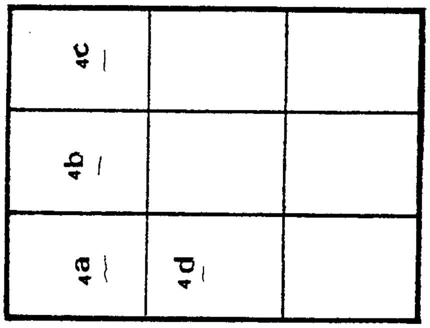
FIG. 2*b:* a plate prepared for the formation of regular tiles but of a larger size than those in FIG. 2*a;*

According to the plate format which may vary for example from 10 cm×10 to 100×100 cm, it is possible to create ensembles (FIGS. 2*a*–2*d*) of tiles 4*a,* 4*b,* 4*c,* . . . with different contours. In FIG. 2*a,* a plate 1 has been prepared for the fabrication of small regular mosaic type tiles. In FIG. 2*b* a plate is used for tiles 4*a,* 4*b,* 4*c* . . . still with straight edges but a larger format. It is possible to make tiles 75×75 cm of a thickness of 1 to 5 mm for use of a mural. Thickness of up to 20 mm can be made for use as floor tiles.

Figure 2C:
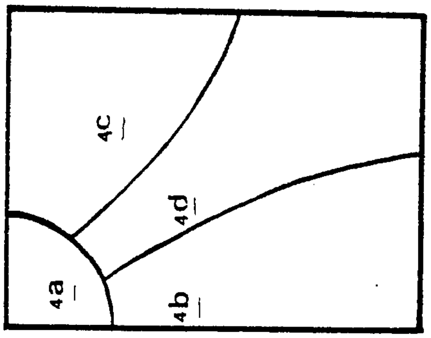
FIG. 2*c:* an ensemble of plates for the formation of an ensemble of tiles introducing a motif type called "vitrail"

FIG. 2*c* is an example of a plate prepared for ensembles of tiles 4*a,* 4*b,*4*c,* 111 in a "Vitrail" pattern. The form and dimensions of these elements can be varied ad infinitum.

Figure 2D:
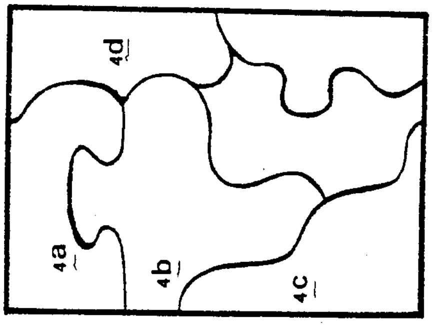
FIG. 2*d:* a plate for a tile type "puzzle" of which some elements show actual edges.

In FIG. 2*d,* the plate 1 is prepared for tiles 4*a,*4*b,*4*d,* . . . of the "puzzle" type in which certain elements show the actual edges.

It should be noted that ensembles are fabricated in one single operation which requires as an example, 3 minutes of electrolysis.

For patterns which have neither an axis nor a centre of symmetry, the creation of right-handed and left-handed items can be exploited to develop either mural or floor motifs in two dimensions with possible matching between different elements of the pattern.

The plates are very easily made and this makes the technique very flexible and allows the patterns to be easily varied by simply changing designs on the plates.

If insulating paint is used, this process can be easily adapted to use of either a paint bruch, by means of a stencil, or to the technique of silk screening. With adhesive tape of well calibrated width, it is also possible to prepare plates very easily and very rapidly. Alternatively, the entire plate is covered with a pressure sensitive adhesive sheet of insulating material of which selected portions are then cut out and removed.

Figure 3A:
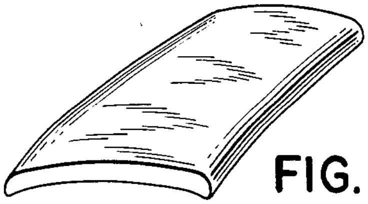
FIG. 3*a:* a curved tile.
Figure 3B:
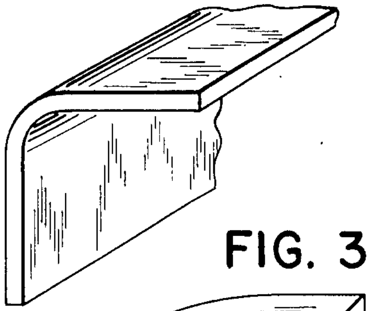
FIG. 3*b:* a right angled tile.
Figure 3C:
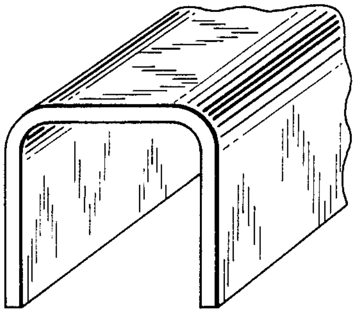
FIG. 3*c:* a U-shaped tile.
Figure 3D:
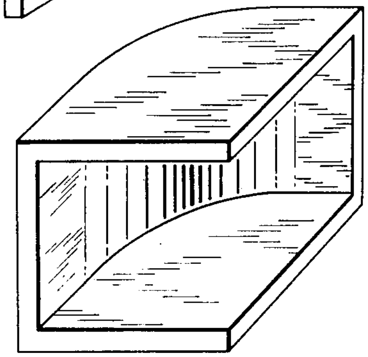
FIGS. 3*d* and 3*d*-: corner tiles.
Figure 3D:
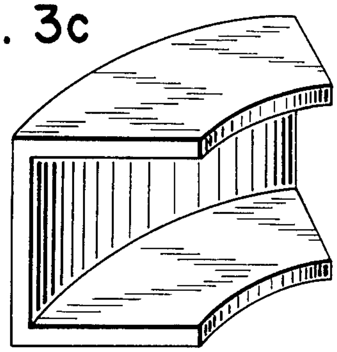
Figure 3E:
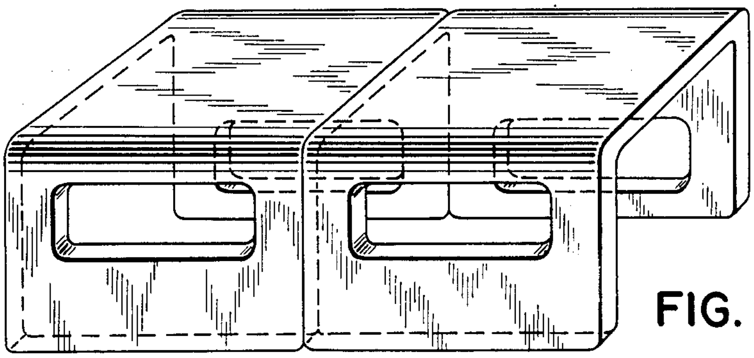
FIG. 3*e:* two cloister tiles.

With the plain plates 1 that are used for the fabrication of flat tiles, it is possible to fabricate structures in space and to give any form to the plate either by embossing, curving, folding, welding. The technique then becomes a matter of fabricating shapes, for example some shapes that can be obtained for such tiles are curved, (FIG. 3*a*), right-angled (FIG. 3*b*), U-shaped (FIG. 3*c*), corners (FIGS. 3*d* and 3*d* primed), cloisters (FIG. 3*e*), straight tubes or bent, the contours of these structures being always limited by the technique of selectively masking the sheet metal or the membranes by means of paint or the membranes by means of paint or insulating tape.

Tiles with a rough surface texture more or less irregular, which imitates pumice stone or lava can be obtained on electrodes metalised with a spray gun or a plasma torch. By way of example, the metalisation of metallic or non-metallic (plastic organic materials) supports by means of a spray gun with zinc is very well suited to prepare electrodes for this type of tile with an irregular rough surface.

Bas-reliefs in ceramic tiles of between 3 and 10 mm thickness can be made by embossing metal sheets or beating into the various metals that were mentioned before. Moulded supports in polymeric materials, metalised at the surface by means of a conducting paint (zinc, copper, silver, nickel) or a chemical metalisation method (examples copper, nickel, silver) allow the reproduction by double casting (negative, positive) of existing bas reliefs. Plates with relief obtained by electroforming in various metals are equally useful for the production of bas reliefs.

Metallic plates pre-etched either mechanically or by acid attack (a technique of aquaregia or photoengraving on zinc, copper or magnesium) allow the transposition onto the ceramic of sunken or hollow patterns or large variety of reliefs.

In photoengraving on a metallic plate, it is the plate itself which serves as the electrode for fabricating the tile. In those cases, it is understood that the surface of the tile against the electrode exhibits the engraving. One can in this way reproduce texts and designs with line engravings or photographs of landscapes, or persons, or pictures etc. In these last cases the negative is reproduced by photoengraving, using the hatching process to apply a texture across the entire space.

The photographs are reproduced onto the ceramic tile with a relief corresponding to the thickness of the engraving in the metallic plate. In such cases one used the negative blocks or the slides for exposure to the engraving plates.

The photographs are thereby well encrusted in relief into the ceramic with very fine detail.

After baking it is possible to enhance the photographs by roll inking with ordinary printing inks or with ceramic inks or coloured glazes.

In stenciling one can work with different inks or enamels of different colours and thus reproduce photographs in colour.

Important documents (the reproduction of text or of works of art) can also be conserved in a fire resistant form.

These reproductions can be made on flat tiles or shaped tiles; to do this it is sufficient to use the engraved plates as electrodes by incorporating the engraved plates in electrodes of a larger format to create an ensemble of ceramic elements in which all or only certain elements compose the reproduction of a motif.

Attenuated reliefs can be obtained on the tiles on the side opposite to that in contact with the metal. To do this one used a property which we have discovered in the fundamental study of the mechanism of electrodeposition of ceramics, namely that the nature of the metal electrode influences the rate of electrodeposition. It is therefore possible to exploit this property to obtain relief. It is sufficient to create a metallic deposit according to a predetermined design on certain areas of the electrode. If the applied metal accelerates the rate of electrodeposition then it will appear on these spots as a relief at the exterior surface of the deposit. If the applied metal on the electrode is in contrast one that reduces the rate of electrodeposition it will correspondingly appear on these spots as hollows at the external surface of the tile. By way of an example, localised copper plating on a plate or zinc will produce hollows in the ceramic. Inversely on a plate of copper localised zinc deposits will provoke zones in relief. The couples Zn-Al, Cu-Al, Zn-Al as well as Fe-Zn can be exploited to product attenuated relieves which present the very great advantage of being obtained on electrodes which remains practically flat. The metallic deposit of extra thickness on the plates are actually of a thickness less than one tenth of a millimeter.

The metal plates are prepared by the usual technique of electroplating after sections of the base plate have been insulated to avoid the deposition of metal on to them.

One can also make this plate bi- or poly metallic using chemical deposition from a bath onto an eventual non-metallic support.

With the assistance of flat tiles with varied contours and profiled elements with or without engraved patterns, it is possible to make up sets of tiles that can be adapted for use on kitchen tables, built-in kitchen sinks, window cases, integrated kitchen elements, bathroom accessories (tap handles, doors, buttons, soap containers etc.) wash basin stands, veneers for artistic lounge room tables.

Figure 4:
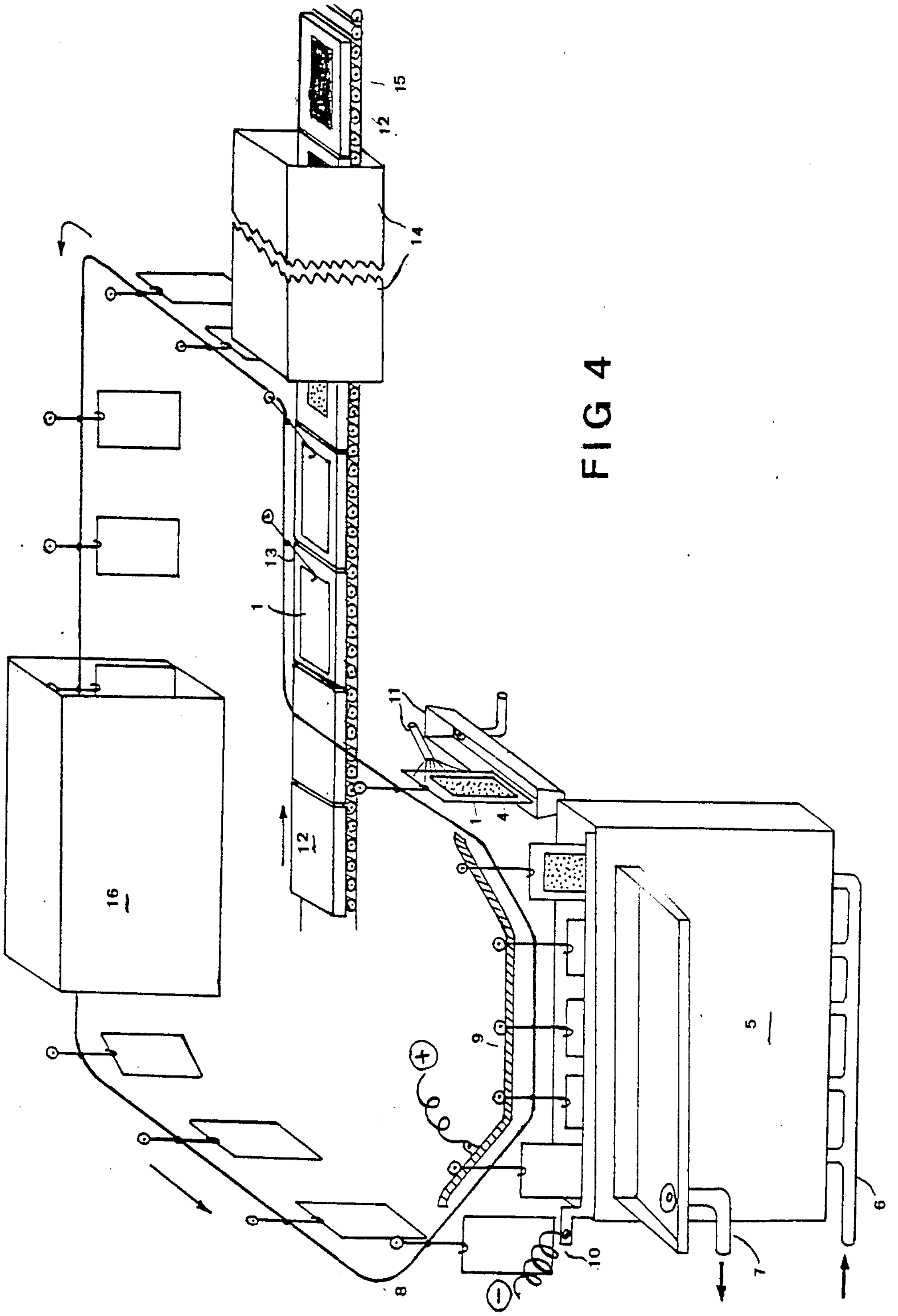
FIG. 4: a schematic outlay of the equipment for continuous production under the present invention.

To put the present invention into operation, one can use continuous fabrication equipment (FIG. 4). This scheme corresponds particularly to equipment for the fabrication of large flat tiles. It can be easily adapted to other types of products described in the present text, particularly for the fabrication in one single operation of mosaic-type ceramic panelling tiles, lead glass or puzzle types of dimensions up to 1 m×1 m.

In FIG. 4 is represented the electrolysis cell 5 of which the dimensions can e.g. be from 3 to 6 m in length, from 15 to 20 cm in width and from 1 meter to 1.50 meter in height; at 6 is shown the entry and distribution port of the agitated feed; at 7 the exit port of the feed which returns to the feed tank.

The electrolysis cell 5 contains a suspension of finely divided ceramic material in a suitable aqueous electrolyte. The composition of the ceramic material is selected according to the product, it is desired to make, for example porcelain, faience, sandstone, gritstone, fire-clay, technical ceramic, alumina, silica, electrical ceramic alumina, silica, electrical porcelain and zirconiz.

The plates 1, which serve as anodes, are transported on a conveyor 8; on entering the cell they are placed under a potential from the electric rail 9 through a gliding or rotating contact attached to each plate. The fixed counter electrode which is constantly immersed in the bath and serves as cathode is situated at 10. As the plates 1 move through the bath, a voltage of from 10 v to 60 v is applied to the plates through the contact with the rail 9 to cause ceramic material of the bath to be deposited on the conductive portions of the plate. Metallic cations coming from the electrode must diffuse in the deposit and not accumulate on the metallic surface in order to build up a deeper layer of ceramic material. The rate at which the plates are transported through the batch is a function of the length of the cell, the voltage applied to the plates, the composition of the bath and the desired thickness of the tile to be produced. For a thickness of from 1 mm to 20 mm, the time the plates are in the bath is from 1 to 20 minutes. At the down stream end of the cell, the plates, with the tile or tiles that have been formed thereon, are raised out of the bath by the conveyor 8 and are disconnected from the electric rail 9.

As the ceramic material is deposited on the electrode plates, it confirms to the surface contour and characteristics of the plate. Moreover, if there are areas of greater surface conductivity, the ceramic material will deposit more rapidly in these areas so as to form attenuated reliefs on the tiles on the side opposite to that in contact with the metal. At the boundaries of the tiles defined by insulation on the plates, the edges are automatically rounded as illustrated in FIG. 1*b*. When two or more tiles are being formed on the same plate by means of separating strips of insulation as illustrated in FIGS. 2*a* to 2*d*, the insulating strips are of sufficient width that edges of adjacent tiles do not meet.

During the electrolysis, adherence of the deposited ceramic material to the electrode plate must be preserved, but when the electrode plate with the deposit thereon is extracted from the bath, stripping of the "green" tile from the plate without damage must be possible. The problem of stripping is more difficult when the tiles are thin and of large area.

Figure 4A:
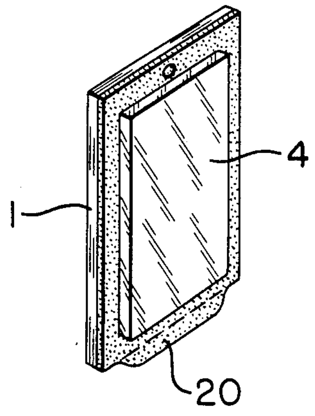
FIG. 4*a:* a schematic perspective view of one of the electrode plates with a membrane applied thereto, and FIG. 4*b* a schematic edge view of an electrode plate with a membrane and ceramic material deposited thereon to form a green tile.
Figure 4B:
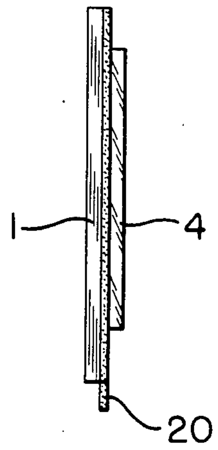

In accordance with the invention, stripping of the green tiles from the plates is implemented by applying a stripping agent to the plates prior to the ceramic material being deposited on them. For example the plates are coated with a thin layer of electrically conductive grease. Preferably a thin, flexible (in the presence of water) membrane 20 is applied to the plate prior to deposition of ceramic material on the plate as illustrated schematically in FIG. 4*a*.

Characteristics of the membrane 20 are good wettability by water, low electrical resistance, i.e. good ionic conductivity and semi-permeability, having either selective ionic exchange capacity or permeability to ionic solutions. The membrane has a thickness of 10–60 microns with a preferred thickness of 40 microns except that when a detailed three dimensional design on the plate is to be imparted to the tile, it is desirable to use a thinner membrane. The membrane may be in the nature of a film, for example a cellulosic film such as Cellophane, or it may be woven or unwoven fabric of fibres such as rayon, nylon or linen.

The membranes facilitate removal of the "green" tiles from the plates and transfer to a supporting surface without damaging the tiles. This is of particular importance in the case of thin tiles of large size, for example, tiles having a thickness of 3 mm and an area of a square meter. Moreover, they prevent direct contact of the electrodeposited ceramic material with the electrode plate and by virtue of their non-permeability to gases prevent gases evolved on the electrode from entering the electrodeposited material to cause porosity. The membranes can also be used to control humidity at the electrode surface in order to avoid excessive shrinkage of the ceramic material upon drying. The membranes can also be used to enhance the local conditioning of the electrode surface as regards surface conductivity. For this purpose various elements (ions or molecules) with an activating or depressing effect, depolarization and coloring effects can be incorporated in the membranes.

For example, if a membrane is impregnated with a conduction electrolyte solution in local areas, this will accelerate electrodeposition of ceramic material in those areas, whereby the thickness of the tile is locally increased to produce a relief effect.

The membranes are easily applied to the electrode plates prior to deposition of ceramic material on the plates, for example by wetting the plate and membrane and rolling or brushing the membrane onto the plate surface. The rolling or brushing is effected from one edge of the plate to the opposite edge in order to remove any air bubbles from between the plate and the membrane. The wetted membrane thereupon adheres to the wetted plate. Usually, the membrane is applied directly to the surface of the plate. However, in some cases cloth or felt is intercalated between the electrode and the membrane in order to avoid oxygen bubbles in the deposit ceramic material.

Alternatively, the membrane, instead of being in contact with the anodes, can be tight on nylon gratings or reinforced by nylon canvas forming a separation between an anodic compartment containing floculating cations and an inert anode with oxygen evolution and the suspension of ceramic material. These membranes are preferably specific cationic exchange membranes like polyfluorohydrocarbons, copolymers of tetrafluoroethylene and vinyl sulphoyl-fluoride of 0.1 to 1 mm thickness or simply semipermeable membranes permitting diffusion of cations like $H^+$, $Na^+$, $K^+$, $Ca^+$, $Mg^+$, $Al^{3+}$ which may not be produced by soluble anodes.

After the electrodeposition of material on the plates to form a tile of the desired thickness, the charged plates leave the cell 5 and pass a drip tray and water spray 11 where the plates and the deposits thereon are rinsed. The plates are thereupon transported by the conveyor 8 to a transfer station where the green tiles are stripped from the plates and deposited on refractory floor tiles 12 moving on rollers. In travelling from the rinsing station to the transfer station, the plates pass through an atmosphere in which the ceramic material is partially dried and thereby partially solidified to constiture the "green" tiles. At the transfer station, the green tiles are placed face down on the refractory floor tiles 12 and the plates 1 are thereupon lifted off of the tiles. Removal of the plates from the tiles is facilitated by the membranes 20 which stay with the tiles. To facilitae the separation of the membranes and tiles from the plates, the membranes may be provided with a portion which extends beyond the edge of the plate so that it can be gripped and pulled from the plate.

After removal from the electrode plates 1, the green tiles are carried by the refractory floor tiles 12 moving on rollers into and through a tunnel furnace 14 where the tiles are further dried and fired. The baked tiles emerge from the furnace at 15.

If the membranes are expendable, they are left on the tiles and are burned off in the furnace 14 without leaving any residue. If on the other hand the membranes are to be reused, they are removed from the tiles before the tiles enter the furnace 14. This is easily done by hand or by suction.

After the plates are removed from the tiles at the transfer station, they are carried by the conveyor 8 to and through a reconditioning station 16 where the plates are cleaned and reconditioned before returning to the electrolysis cell.

Glazing, which is not represented in FIG. 4 can be included into the fabrication chain. This can be done by using a powdered glaze feed before firing or by the technique of the inked roller. In that case, the surface of the tile on the electrode side is best glazable. With a spray gun depositing enamel it is possible to glaze in colour on engraved tiles.

Glazing by double firing of the unglazed ceramic (that is after the passage through the furnace) can better be done by a glazing on the other face of the tiles or by glazing with different colours by using a technique to be described below or again by multi-colouring or glazing pieces with various patterns in relief.

Although the electrodeposition can be carried out in as little time as one to five minutes for thicknesses between 1 and 5 mm, it is specifically the drying and firing which constitute the slow stage in the manufacture of the finished tiles.

If the capacity of the furnace allows it, it is possible with a cell of $\pm 6$ meters in length to fabricate a plate of $1 \times 1$ meter per minute in a conveyor belt advancing at the rate of 1 meter per minute. At that rate a single cell can support a production chain for an automated fashion, tiles at the rate of approximately 50 $m^2$ sq per hour or 1200 $m^2$ sq during 24 hours which leads to a production rate of 250,000 square meters per year. The conveyor belt consists of some 30 plates of which the replacement frequency depends on the bulk of metal used. If it consists of zinc, for example, one can count on a consumption of $\pm$microns in 24 hours (actual immersion time). The decrease in thickness of the zinc plates of $\pm 400$ microns on 30 plates of which only 5 are emerged at the time takes $6 \times 24$ hours.

During such a cycle of $6 \times 24 = 144$ hours, one consumes for the 30 plates (30 $m^2$ sq) and for the production $6 \times 1200$-7200 $m^2$ sq of tiles of 50 mm thickness (that is approximately 90 tonnes of fire tiles) $\pm 40$ kg of zinc. The consumation of electrical energy strictly necessary for the electrodeposition remains negligible; it is a maximum of 7 kwh per tone of product. The potential remains less than 50 volts and the current less than 50 $miAlcm^{-2}$.

One can of course place several electrolysis cell in parallel to increase the production is necessary.

What I claim is:

1. A process for producing ceramic tiles which comprises:

providing a plurality of metallic plates, each of an area greater than that of tiles to be produced, applying to a surface of each of said plates electrical insulating material defining the boundaries of at least one active area of said surface for producing at least one tile, providing on said surface electrically conductive separating means for temporary adhesion of electrodeposited ceramic material on said active area and subsequent removal of said electrodeposited material from said plate, transporting said plates sequentially through a bath of finely divided ceramic material suspended in an aqueous electrolyte, applying an electrical potential of selected value between said plates while in said bath and a counter electrode to produce electrodeposition of ceramic material from said bath onto said active area of said surface of each of said plates within the boundaries defined by said insulating material, the value and time of application of said potential being selected to build up on said active area of said surface of said plate a deposit of ceramic material having a thickness of from 1 mm to 20 mm, removing said plates sequentially from said bath with said deposits on said plates and partially drying said deposits to constitute green tiles, stripping said green tiles intact from said plates onto heat resistant supports, transporting said supports with said green tiles thereon into a furnace and there firing said tiles.

2. Process according to claim 1, in which said separating means comprises thin flexible membranes applied to said surfaces of said plates prior to deposition of ceramic material thereon, said membranes having the properties of flexibility, good wettability by water and good ionic conductivity.

3. Process according to claim 2, in which said membranes are selected from the group consisting of film, woven fabrics and unwoven fabrics.

4. Process according to claim 2, in which said membranes have a thickness in the range of 10 to 60 microns.

5. Process according to claim 2 in which an absorbent layer is intercalated between said membranes and said plates.

6. Process according to claim 2, in which said membranes are removed from said green tiles after said green tiles are removed from said plates and before they are fired.

7. Process according to claim 2, in which said membranes are burned off of said tiles when said tiles are fired.

8. Process according to claim 1, in which said separating means comprises a coating of conductive grease applied to said surface of said plates prior to deposition of ceramic material thereon.

9. Process according to claim 1, in which said plates are suspended from and transported through said bath by a conveyor.

10. Process according to claim 9, in which said plates are further transported by said conveyor sequentially through a rinsing station where said plates with said deposits thereon are subjected to a water spray and a drying station where said partial drying of said deposits is effected.

11. Process according to claim 10, in which said plates, after removal of said deposits therefrom, are further transported by said conveyor to a station for reconditioning said plates for reuse.

12. Process according to claim 1, in which said insulating material is applied to said surfaces of said plates along lines dividing each of said surfaces into a plurality of separate areas for the production of a plurality of tiles simultaneously on each plate.

13. Process according to claim 1, in which said insulating material comprises insulating paint.

14. Process according to claim 1, in which said insulating material comprises pressure sensitive adhesive tape.

15. Process according to claim 1, in which said insulating material comprises a sheet of adhesive material applied to cover the entire plate surface, portions of said sheet being thereafter cut out and removed to expose selected areas of said plate surface.

16. Apparatus for producing ceramic tiles which comprises:

an elongate tank containing a bath of finely divided ceramic material suspended in an aqueous electrolyte and a counter electrode, a plurality of metallic plates each having a surface of an area greater than that of tiles to be produced and having applied to said surface insulating material defining the boundaries of at least one active area of said surface for producing at least one tile and electrically conductive separating means for temporary adhesion of electrodeposited ceramic material on said active area and subsequent removal of said electrodeposited material from said plate, means for transporting said plates sequentially through said bath at a selected rate, means for applying an electrical potential of selected value between said plates while in said bath and said counter electrode to produce electrodeposition of ceramic material from said bath onto said surface of said plates within the boundaries defined by said insulating material, the value of said potential and the rate of transport of said plates being selected to build up on said surface of said plates a deposit of ceramic material having a thickness of from 1 mm to 20 mm, means for transporting said plates with said deposits thereon from said bath, through an atmosphere in which said deposits are partially dried to constitute green tiles, and then to a transfer station for stripping said green tiles from said plates, a firing furnace, and support means for receiving said green tiles at said transfer station and conveying them into said furnace for firing.

17. Apparatus according to claim 16, further comprising means for spraying water on said plates with said deposits thereon as said plates are transported from said bath to said transfer station to rinse said plates and deposits.

18. Apparatus according to claim 16, in which said means for supplying voltage between said plates and said counter electrode comprises an electric rail extending over said bath and means carried by each of said plates contacting said rail as said plates are transported through said bath.

19. Apparatus according to claim 16, further comprising a reconditioning station comprising means for cleaning and reconditioning said plates, and means for transporting said plates from said transfer station to said reconditioning station.

20. Apparatus for producing ceramic tiles which comprises:

a plurality of metallic plates each of an area greater than that of tiles to be produced and having applied to a surface thereof insulating material defining the boundaries of at least one active area of said surface for producing at least one tile and electrically conductive separating means for temporary adhesion of electrodeposited ceramic material on said active area and subsequent removal of said electrodeposited material from said plate, a tile forming station comprising an elongate tank containing a bath of finely divided ceramic material suspended in an aqueous electrolyte for receiving said plates, a counter electrode in said bath and means for applying an electrical potential between said plates received in said bath and said counter electrode to produce electrodeposition of ceramic material from said bath onto said surfaces of said plates within the boundaries defined by said insulating material to buildup on said surfaces of said plates a deposit of ceramic material for forming tiles, a drying station wherein said plates after removal from said bath with said deposits thereon are subjected to a dehydrating atmosphere for partially drying said deposits to constitute green tiles, a transfer station wherein green tiles are stripped intact from said plates and transferred to heat resistant supports, transport means for transporting said plates through said bath at a rate selected to provide a period of time in said bath for building up on said plates deposits of ceramic material of a thickness of from 1 mm to 20 mm, and through said drying station to said transfer station, and a firing station comprising a firing furnace, and means for conveying said heat resistant supports with said green tiles thereon into said furnace for firing.

21. A process for producing ceramic tiles which comprises:

providing a metal plate having a surface of an area greater than that of tiles to be produced, applying to a surface of said plate electrical insulating material defining boundaries of at least one active area of said surface for producing at least one tile, applying to said surface of said plate a membrane having the properties of good wettability by water and good ionic conductivity immersing said plate with said membrane thereon in a bath of finely divided ceramic material suspended in an aqueous electrolyte and applying an electric potential between said plate and a counter electrode in said bath to produce electrodeposition of ceramic material from said bath onto said surface of said plate within boundaries defined by said insulating material to build up on said plate within said boundaries a deposit of ceramic material having a thickness of from 1 mm to 20 mm, removing said plate from said bath and partially drying said deposit thereon to constitute a green tile, stripping said green tile with said membrane from said plate and depositing it on a heat resistant support, and transporting said support with said green tile thereon into a furnace and there firing said tile.

22. A process according to claim 21, in which said membrane is stripped from said green tile prior to firing.

23. A process according to claim 21, in which said membrane is combustible and is consumed during the firing of said tile.

24. Process according to claim 2, in which said membranes selected from the group consisting of polyfluorohydrocarbons, copolymers of tetrafluoroethylene and vinyl sulphoylfluoride of 0.1 to 1 mm thickness.

25. Apparatus according to claim 16, in which said electrically conductive separating means comprises a membrane having the properties of flexibility, good wettability by water and good ionic conductivity.

26. Apparatus according to claim 20, in which said electrically conductive separating means comprises a membrane having the properties of flexibility, good wettability by water and good ionic conductivity.

* * * * *